A. Colburn,
Harness.
N° 34,671. Patented Mar. 18, 1862.
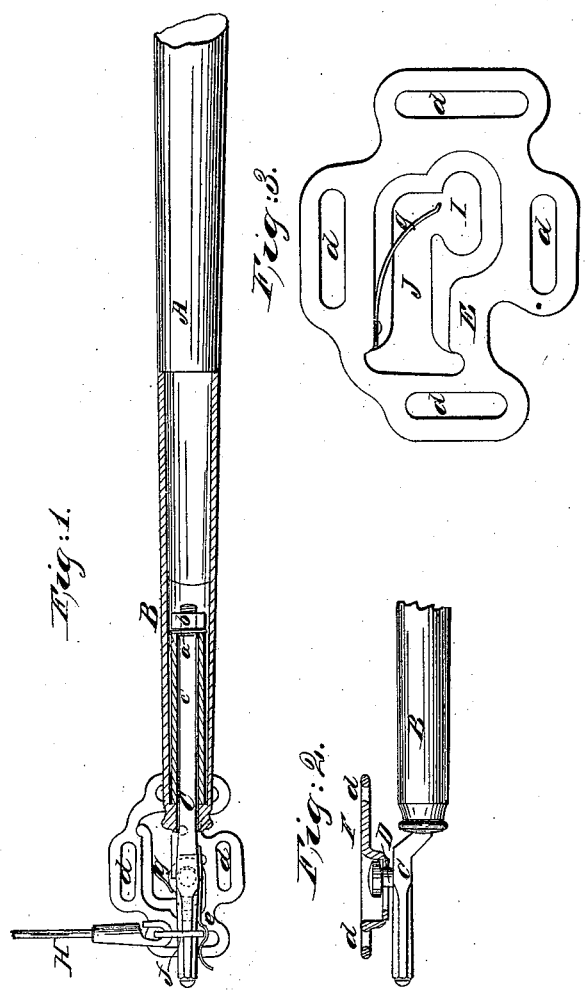
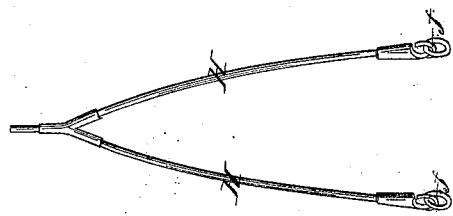
Witnesses:
J W Coombs
G W Reed
Inventor:
A. Colburn
per Munn & Co
Attorneys

UNITED STATES PATENT OFFICE.

A. COLBURN, OF LEOMINSTER, MASSACHUSETTS.

IMPROVED MODE OF ATTACHING HORSES TO VEHICLES AND DETACHING THEM THEREFROM.

Specification forming part of Letters Patent No. 34,671, dated March 18, 1862.

*To all whom it may concern:*

Be it known that I, A. COLBURN, of Leominster, in the county of Worcester and State of Massachusetts, have invented a new and Improved Mode of Attaching Horses to Vehicles; and I do hereby declare that the following is a full, clear, and exact description of the same, reference being had to the accompanying drawings, making a part of this specification, in which—

Figure 1 represents the attachment for one side of the horse to the shaft by a side view, the ferrule on the end of the shaft being shown in section. Fig. 2 represents a top view of the same, showing the plate attached to the harness of the horse in section. Fig. 3 represents an under side view of a plate of full size.

Similar letters of reference indicate corresponding parts in the several figures.

The object of this invention is to obtain a simple and efficient device for attaching horses to vehicles, which, besides enabling the horse to be more easily and expeditiously attached or detached from the carriage, will bring the animal under the perfect control of the driver, so that in case he attempts to run away or in any otherwise becomes unmanageable he can be freed or let loose from the carriage without endangering the lives of the persons therein.

The invention consists in the manner of arranging a yielding catch-bar in the ferrules on the ends of the thills of the vehicle and attaching the thills to the animal by the said catch-bars engaging with correspondingly-slotted metal plates attached one on each side of the horse.

It also consists in the mode of detaching the horse from the vehicle in case he becomes unmanageable, thus furnishing a perfect safeguard for a family carriage.

To enable others skilled in the art to fully understand and construct my invention, I will proceed to describe it.

In Fig. 1, A represents a fragment of a carriage-thill, and B a metal ferrule, which is fitted upon the front or outer end of the same and secured by screws passing transversely through it and through the thill, or it may be secured in any other suitable manner. This ferrule extends about one-half of its length over the end of the thill and has a square hole made in its outer end, in which is fitted a bar C, adapted to slide back and forth in the extension of the ferrule. The inner end of this bar has a screw-thread cut on it and a washer *a* and nut *b* fitted upon it. Between this washer and nut and the end of the ferrule a metal or rubber spring *c* encompasses the bar C and acts to relieve the animal or carriage from any sudden shock or strain and thus prevent injury to either. That portion of the bar C which protrudes through the ferrule is offset inwardly so as to bring its inner side a little inside of the thills to prevent them from chafing or touching the animal and has secured in this inner side a draw-pin D, which is provided with a head on its outer extremity.

F is a metal plate, which forms a part of the attachment of the horse to the vehicle. This plate is made of brass, or it may be of any other suitable composition or metal, and it has formed in each side of it a loop-hole *d*, and in the middle (which is a protuberance on the plate) a double-slot I J, the former of which serves to attach the plates by its sides, respectively, to the breast-plate or hame-strap, saddle, belly, and breech straps and by them to the side of the animal, and the latter to attach the horse to the thills of the vehicle. The double slot in the plate, and by which the attachment of the horse to the vehicle is made, is open only at its back end. Secured to the under side of the bar *e* is a metal-plate spring, which is bent near its loose end in ogee form to retain the ring *f* of the line H in place on the draw-bar and to prevent it from casually working off, at the same time allowing it to be slipped off over the end of the bar when the animal is let loose from the thills.

H is a strap or line, which, being attached by the ring *f* to the draw-bar C, passes through a ring on the hame or shoulder strap to the carriage and enables a person sitting therein to detach a running horse from the carriage without moving from the seat, thereby furnishing a perfect safeguard to family and other carriages against accidents from any such cause.

It will be understood in this description that the devices for attaching the thills to both sides of the horse are precisely alike, except that they are made rights and lefts to correspond with the right and left sides of the horse. Therefore a description of the devices for one side will answer for both.

The mode of attaching a horse to a vehicle is as follows: The metal plates being attached to the sides of the horse, as hereinbefore described, he is backed into the thills of the carriage, they being elevated in the usual manner, so as to have the draw-pins enter the slots in the plate. Upon the horse being backed a little after the draw-pins have entered the slots J in the plates, they drop into the second slot I, and the thills are thereby prevented from spontaneously becoming detached from the horse. A spring $g$, which is attached to the plate and rests upon the head of the draw-pin, furnishes additional security against the horse becoming casually detached from the thills. All the strain of the horse in drawing and backing the vehicle comes upon the metal plate and draw-pin.

When it is desired to detach a horse from the vehicle while he is in motion, it is effected by pulling upon the line H, which, drawing through the rings on the shoulder-straps or hames, lifts the ends of the thills and allows the animal to escape. At the same time the line should be let loose to go with the horse, which he takes with him by pulling it from between the springs and draw-bars, the thills falling to the ground.

The yielding motion of the draw-bars, imparted to them by the springs, gives an easy motion to the horse and carriage and relieves both from any sudden shock or strain.

If preferred, instead of the draw-bars being attached to and drawing from the ends of the thills they may be attached to a whiffletree by a rod passing under or through the thills and attached to the inner end of the draw-bar, the result in both cases being the same.

Having thus described my invention, what I claim as new, and desire to secure by Letters Patent, is—

1. The mode herein described of attaching horses to vehicles by means of the draw-bar C, draw-pins D, and double-slotted plates E I J, when combined and arranged to operate as set forth.

2. The combination of the strap H, rings $f$, draw-bar C, spring $e$, and slotted plates E I J, when arranged to operate in the manner and for the purpose set forth.

A. COLBURN.

Witnesses:
C. H. B. SNOW,
ANDREW NOREUP.